United States Patent
Warner

[11] 3,897,957
[45] Aug. 5, 1975

[54] RING SEAL, ASSEMBLY AND METHOD OF MANUFACTURING

[75] Inventor: Dale J. Warner, Oaklawn, Ill.

[73] Assignee: Gits Brothers Manufacturing Co., Chicago, Ill.

[22] Filed: Feb. 12, 1974

[21] Appl. No.: 441,835

Related U.S. Application Data

[63] Continuation-in-part of Ser. No. 263,858, June 19, 1972, abandoned.

[52] U.S. Cl. .................................................. 277/85
[51] Int. Cl. ............................................. F16j 15/40
[58] Field of Search ............................ 277/38–43, 277/81, 85, 86, 87, 89, 90, 92, 95

[56] References Cited
UNITED STATES PATENTS

| | | | |
|---|---|---|---|
| 2,220,771 | 11/1940 | McHugh | 277/87 |
| 2,378,095 | 6/1945 | Payne | 277/87 |
| 2,898,167 | 8/1959 | Tanner | 277/164 |
| 2,979,350 | 4/1961 | Lansky | 277/205 |
| 3,114,561 | 12/1963 | Creath et al. | 277/205 |
| 3,297,331 | 1/1967 | Tracy | 277/87 |
| 3,552,752 | 1/1971 | Lojkutz | 277/87 |

FOREIGN PATENTS OR APPLICATIONS

| | | | |
|---|---|---|---|
| 527,189 | 7/1956 | Canada | 277/87 |

OTHER PUBLICATIONS

Sealing Points Fill Of Flash etc. by Wessel, Am Machinist, Aug. 2, 1945, pp. 122–123.

*Primary Examiner*—Robert I. Smith
*Attorney, Agent, or Firm*—Hill, Gross, Simpson, Van Santen, Steadman, Chiara & Simpson

[57] ABSTRACT

A shaft seal of the radial mating face type having a primary seal and a secondary seal, the secondary seal forming a seal interior of a housing between an axially movable portion attached to the primary seal and a wall of the housing. The secondary seal is a ring seal substantially C-shaped in cross section.

4 Claims, 7 Drawing Figures

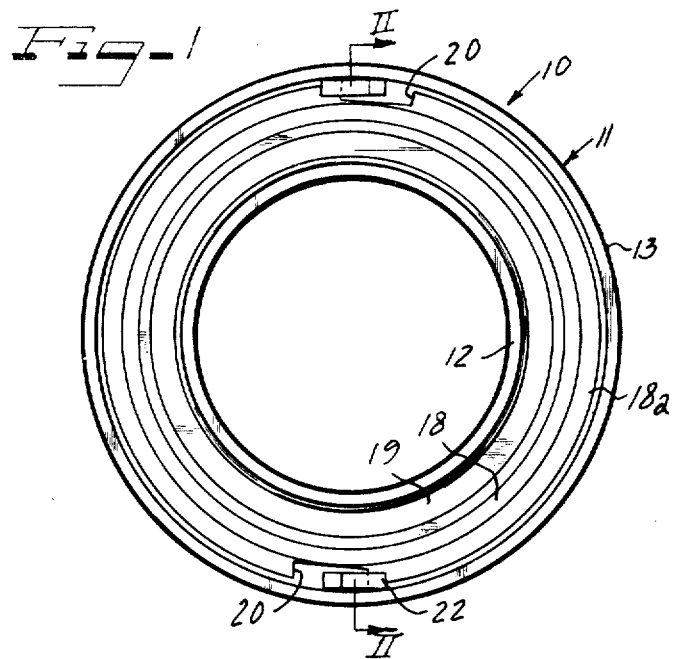
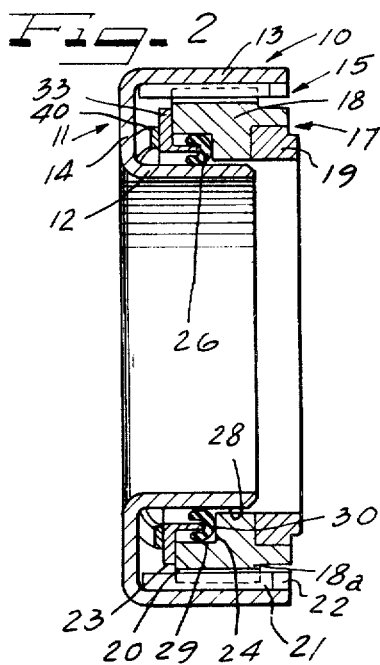
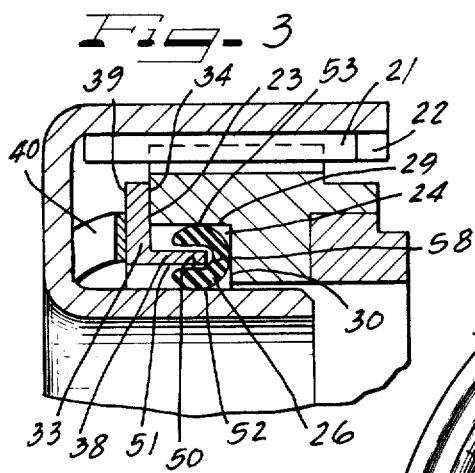
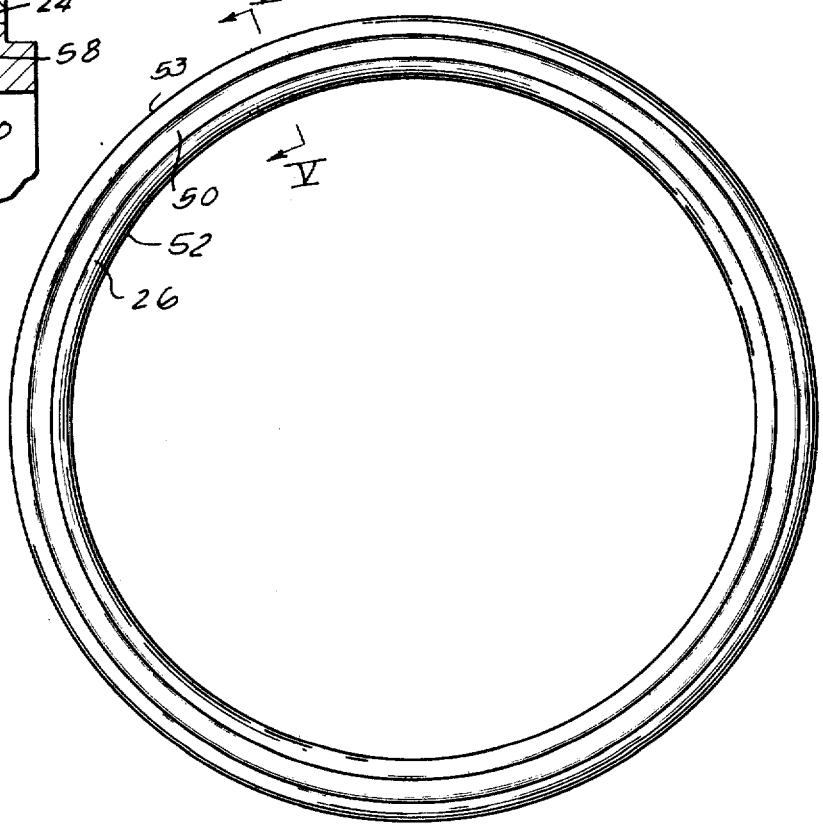
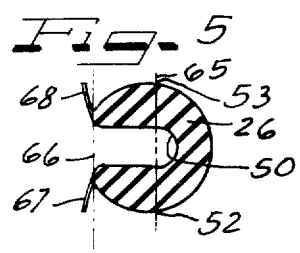
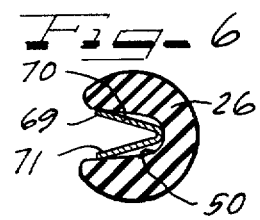

3,897,957

RING SEAL, ASSEMBLY AND METHOD OF MANUFACTURING

RELATED CASES

This application is a continuation-in-part of the application of Dale J. Warner entitled "Ring Seal, Assembly and Method of Manufacturing", Ser. No. 263,858 filed June 19, 1972, and now abandoned.

BACKGROUND OF THE INVENTION

1. Field of the Invention

This invention relates to seals and more particularly to a C-shaped cross-section ring seal and a sealing assembly using such a seal, and a method of manufacturing a novel ring seal.

2. Prior Art

A standard type of shaft seal utilizes a U-shaped cross section ring housing which is received in the shaft housing with the shaft projecting through a seal housing. A primary seal ring of the mating face type is received within the seal housing and is axially movable therein. A spring between a bottom wall of the seal housing and the primary seal ring urges the primary seal ring out of the open end of the seal housing into contact with a shaft-carried abutment.

A secondary seal is formed interior of the seal housing. Secondary seals often take the form of ring seal members entrapped between a portion of the primary seal ring member or carrying member and a wall of the seal housing.

It has been known to use an O-ring as the secondary seal.

The wear life of the primary seal is oftentimes adversely affected by the nature of the design which may impose excessive face loading on the primary seal. The face load necessary is dictated by:

1. The minimal force required to effect a sealing;
2. The spring rate when applied over the required operating range of the seal; and
3. The hysteresis or drag of the secondary seal.

It has therefore been necessary to design a seal with a spring load between the primary seal member and the seal housing capable of effecting (1) plus overcoming (3) with an additive factor of (2) as set forth.

It is therefore desirable to minimize the hysteresis of the secondary seal. However, normal secondary seals using O-rings have required an interference fit. That is, the O-ring has to be squeezed between the outer diameter of the inner wall of the seal housing and the primary seal member or carrier ring. The interference fit itself adds to the hysteresis of the secondary seal. This is further compounded by the dimensional stackup of tolerances involved in the component parts.

As an additive factor, the O-rings themselves are subject to swelling and compression set.

Additionally, prior art O-rings are normally manufactured with the parting line of the mold used in forming the O-ring placed at the cross section of the ring on the inner and outer diameter surfaces. In trimming the flash resulting from the parting line of the mold, there is normally dimensional variation and the desired circular cross section normally has flat surfaces upon the inner and outer diameter as a result of trimming of the flash. This increases the hysteresis.

All of these factors result in an increasing of the hysteresis of the secondary seal, which, if uncompensated for would cause the seal to either become inoperative or sluggish in response to axial movement. Thus, the ring will either fail prematurely or it will be overdesigned to the extent of the pressure applied by the spring to compensate for the increased hysteresis.

This results in an overloading of the primary seal face causing excessive wear at that mating face.

It would therefore be a definite advance in the art if a ring having the sealing characteristics of an O-ring, but without the above disadvantages, could be used as the secondary seal ring of a shaft seal of the character discussed.

SUMMARY OF THE INVENTION

My invention provides a ring seal having definite advantages over the prior art O-rings. My ring seal can be considered as an O-ring having approximately 25% of its cross section truncated. Further, a groove is then molded into the body of the remaining portion of the O-ring, the groove having a width and depth approximately 50% of the cross section diameter. This results in a ring seal having a cross section substantially C-shaped.

Thus, the inner and outer diameters of my ring seal correspond to the inner and outer diameters of an O-ring. However, the groove which extends into the body of the ring seal from an axial end surface provides for the elimination of many of the above-discussed undesirable features of prior art O-rings. The groove allows the ring seal to collapse partially in a radial direction when necessary to reduce hysteresis. Further, the seal is designed to be molded with the parting line of the molds occurring at the juncture of the open end of the C configuration or at a point remote from the inner and outer diameter line. This allows flash trimming to be a less critical operation inasmuch as the flash is not trimmed along a seal line. It further causes a smooth unaltered radius on the inner and outer diameters. The mold is capable of being used with the parting line spaced from the inner and outer diameter radial line because the C shape permits the collapse of the ring seal for removal from the mold.

The ring seal of this invention can be received in a shaft seal assembly with a ferrule having a nose portion extending into the groove of the ring seal. This prevents rotation of the ring seal in the assembly and further applies pressure through the back wall of the ring to maintain it in position in the assembly. Additionally, installing the ring seal of this invention in the assembly with the groove open to the high pressure area of the assembly allows the ring seal to function as a self-energizing seal which is pressure-responsive for increased sealing.

In a modified form of this invention, I have provided a V-shaped cross section spring received in the groove to provide an outward cross section spring received in the groove to provide an outward bias to the walls of the groove for maintaining sealing of the ring.

It is therefore an object of my invention to provide an improved ring seal having reduced hysteresis when embodied in a seal assembly.

It is a further object of my invention to provide a C-shaped cross section ring seal.

It is another and more specific object of this invention to provide a seal assembly having primary and secondary seals wherein the secondary seal is a C-shaped cross section ring seal.

It is a still further and most specific object of this invention to provide a shaft seal assembly having a U-shaped cross section axially open-ended housing containing a primary seal member axially urged from the housing and an elastomeric secondary seal member entrapped between a portion of the primary seal assembly and a face of the housing, the secondary seal being a C-shaped cross section ring seal with reduced hysteresis.

BRIEF DESCRIPTION OF THE DRAWINGS

Other objects, features, and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is an end plan view of a seal assembly according to this invention;

FIG. 2 is a cross-sectional view of the seal assembly of FIG. 1 taken along the lines II—II;

FIG. 3 is an enlarged fragmentary cross-sectional view similar to FIG. 2;

FIG. 4 is a plan view of the ring seal of this invention;

FIG. 5 is a cross-sectional view of the ring seal of this invention taken along the lines V—V of FIG. 4 and illustrating the flash formed during molding;

FIG. 6 is a view similar to FIG. 5 illustrating a modified form of the invention.

DESCRIPTION OF THE PREFERRED EMBODIMENTS

Figure 7:
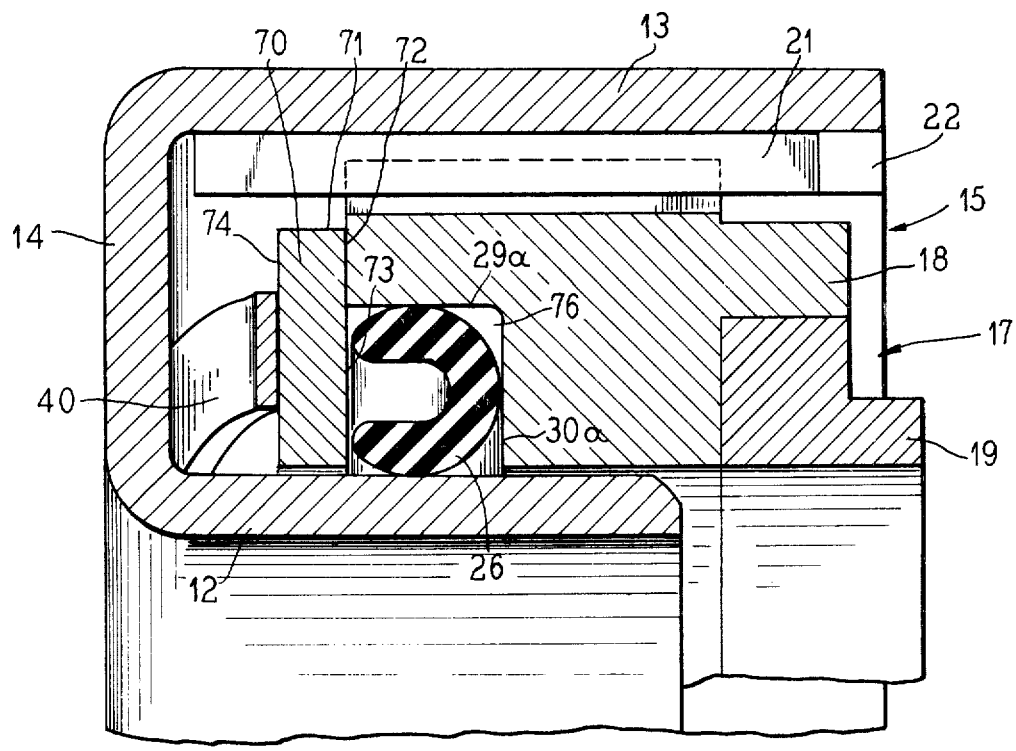
FIG. 7 is a view similar to FIG. 2 illustrating another embodiment.

FIGS. 1 and 2 illustrate a seal assembly 10 designed for use as a shaft seal. The assembly 10 includes a housing 11 having inner 12 and outer 13 axially extending legs interconnected through a radial bight wall 14 at one end of the legs 12 and 13. The other ends 15 of the legs terminate in an open face giving access to an internal groove. The housing 11 is U-shaped in cross section with an axial open end.

Disposed within the housing 11 is a seal assembly including a primary seal assembly 17 which includes a carrier ring 18 which has a stepped axial end face carrying a seal member 19 of the face seal type. The seal member 19 extends beyond the axial end of the carrier ring 18 and projects out of the open end 15 of the housing 11. The carrier ring 18 has an outer diameter reduced axial thickness portion providing a step at the open end 15. The reduced axial thickness portion 18a has diametrically opposed axially extending grooves 20 therein, which index with T-shaped locking devices 21 which in turn are attached to the inner diameter face of the outer diameter leg 13. The locking devices 21 have T-end heads 22 thereon adjacent the open end 15 and the grooves 20 have a circumferential dimension slightly greater than the circumferential dimension of the T-heads 22 whereby when the grooves 20 are aligned with the T-heads, the carrier ring 18 may be inserted into the housing. Thereafter, circumferential rotation of the carrier ring 18 with respect to the housing will lock the carrier ring in the housing so that it cannot be forced out the open end 15 due to abutment between the portion 18a of the carrier ring and the T-head 22. Further, circumferential rotation of the carrier ring within the housing is prevented by abutment between the side walls of the grooves 20 and the main portion of the locking devices 21.

The end 23 of the carrier ring 18 remote from the primary seal ring 19 is stepped at its inner diameter as at 24. A secondary seal 26 is positioned in the stepped portion and is in contact with the outer diameter 28 of the inner diameter leg 12 as well as with the inner diameter 29 of the carrier ring at the stepped portion and a radial wall 30 of the stepped portion. A ferrule 33 has a radial wall 34 in contact with the back wall 23 of the carrier ring and in the illustrated embodiment of FIG. 1, has an inner diameter radially extending nose 38 projecting into the stepped portion 24. The ferrule has a second radial wall 39 opposite the wall 34 which is contacted by a wave spring 40 entrapped between the radial bight wall 14 of the housing and the radial wall 39 of the ferrule. The wave spring provides an axial bias to the seal assembly to force the primary seal ring out of the open end 15 within the limits of travel provided by the locking device 21 and the T-head 22.

The secondary seal ring 26 is a C-shaped resilient material ring such as a rubber or plastic having resilient properties. A preferred rubber is that which is know as Viton. The ring is molded with an internal groove 50 extending thereinto from an axial end face 51 leaving the inner 52 and outer 53 diameters arcuately formed. The remainder of the ring is substantially an O-shaped ring except for the truncated end 51 and groove 50.

The nose 38 of the ferrule 33 extends into the groove 50. The nose can terminate against the back wall 58 of the groove to force the secondary ring against the radial wall 30 of the step. As illustrated in FIG. 3, the ferrule can have a narrower radial thickness whereby it is loosely received in the groove. The projection of the ferrule into the groove prevents the secondary seal from rotating when the entire assembly moves axially within the housing.

By providing a ferrule which is slightly radially less thick than the groove, the ring is subject to radial collapse to reduce the hysteresis drag of the secondary C-ring.

Preferably, the secondary seal ring is received in the step 24 with the groove 50 open to the high pressure to be sealed by the assembly. In this manner, the pressure acts to expand the body of the secondary seal ring into tighter sealing engagement with the walls 30,29 of the step and the inner leg 12 of the housing.

As illustrated in FIG. 5, the secondary seal ring is preferably formed in a mold which closes at a point spaced from the inner and outer diameter radial line 65. The line of mold closure illustrated at FIG. 5 is shown as at 66. This provides flash from the mold closure at points 67 and 68 removed from the inner 52 and outer 53 diameter points which provide the sealing points. Thus, removal of the flash 67 and 68 does not effect the sealing of the ring and does not provide flat spots at the sealing points which would increase the hysteresis. The use of a mold closing at a point less than the major diameter point of the ring is possible because of the groove 50 which allows collapse of the seal 26 for removal from the major portion of the mold.

FIG. 6 illustrates a further embodiment where the groove 50 receives a V-shaped cross section spring 69 which is radially expansive between the legs 70 and 71 of the V to maintain the groove 50 in a full open position. When the ring with the spring 69 is received in a sealing seat such as the step 24 or a corresponding like seat, the spring 69 maintains the ring in sealing relation irrespective of the presence of pressure. This allows the ring to function adequately as a pressure reversing seal or as a static seal. However, the use of the spring allows greater control of the sealing pressure than the heretofore used O-rings which were fitted with an interference fit.

FIG. 7 illustrates a modified form of this invention. The modification is substantially the same as the seal assembly illustrated in FIGS. 2 and 3 and has been identified by like numbered numerals. The major difference is that the ferrule 70 is a flat ring washer which has an outer diameter portion 71 bottoming against a back wall 72 of the carrier ring 18. The ferrule 70 has radially flat axial end faces 73 and 74. The carrier ring 18 is stepped as indicated by FIGS. 6 and 7 in the same manner as the carrier ring of FIGS. 2 and 3, however the axial depth of the step is less than is illustrated in FIGS. 2 and 3 with the inner diameter wall 29a of the carrier ring at the step portion being dimensioned with respect to the axial thickness of the secondary seal 26 such that the axial depth of the step may be slightly larger than the secondary seal 26. In this manner the chamber formed by the radial wall 30a of the step portion, the axial wall 29a of the step portion, the axial face 73 of the ferrule 70 and the outer diameter of the inner diameter leg 12 receives the secondary seal 26 with limited axial clearance. In this manner, because of the truncated end face of the secondary seal 26, rotation of the secondary seal is prevented without the necessity of utilizing the nose 38 of the ferrule 33 shown in previous embodiments. This prevents the nose from interfering with the swelling of the elastomer C-ring secondary seal 26 or from interfering with desired radial collapse of the inner and outer leg portion thereof. This has the added advantage of reducing the tolerances necessary in the creation of the nose 38 of previous disclosed embodiments.

Seal assemblies constructed according to the teachings of this invention have experienced fantastic increase in seal life without reduction in any of the sealing or operating characteristics of the assembly.

Since one of the major limiting factors of seal life is the necessity of using overly strong springs to overcome the hysteresis drag of the secondary seal, and since the use of the herein disclosed secondary seal in the illustrated seal assembly reduces the hysteresis drag thereby allowing reduction in spring force, seal life can be increased by up to 500% over previously known seal assemblies.

Tests made comparing the herein disclosed construction with typical prior art conventional seal constructions utilizing O-ring secondary seals dramatically show a difference in hysteresis.

In each of the following tests hysteresis was measured by a hysteresis testing device, Model TM manufactured by Instron Corporation. In each instance the assembled seal is placed on a stationary test bed and is then compressed by a moving member. The resistance to compression is measured continuously during movement of the moving member. Resistance is first measured by moving the moving member against the sealing face of the seal assembly to compress it from its maximum operating length to its minimum operating length. Thereafter the moving member is backed off and the pressure applied by the seal face against the moving member is continuously recorded. When the moving member is compressing the seal assembly from its maximum to its minimum length, the results are herein referred to as download pressure. When the moving member is withdrawing from the seal to allow the seal to return from its compressed minimum length to its maximum length, the results are referred to as upload. The difference between the download and the upload at any length of seal movement represents the hysteresis of the seal assembly.

All tests hereinafter set forth were done on a seal assembly having a maximum operating length of 0.719 inch and a minimum operating length of 0.656 inch and the load readings taken at those points are herein listed except for Test A which was run on a stock seal having similar design but a different operating length.

TEST A

This test was run on a seal assembly as illustrated in FIGS. 2 and 3 but without the nose 38 of the ferrule. The secondary seal was a conventional O-ring seal. The seal was run on a test rig simulating engine operating conditions. Hysteresis was determined before initiation of the running test and after completion of 647 hours of running. When removed from the running test equipment after 647 hours, it was found that the O-ring had become securely adhered to contacting parts. The ring was unstuck and then tested in the hysteresis testing device to arrive at the disclosed results. The assembly was run with a shaft rpm between 6,900 and 7,400 and was lubricated with MIL-L-7808 oil at a temperature of 400°F. and a sealing pressure 6 psi. The seal assembly differs only from the assemblies of the other disclosed tests in that it had an operating length of between 0.656 inch and 0.719 inch.

|  | Seal Length | Down-Load | Up-Load | Difference |
|---|---|---|---|---|
| At beginning of test: | .719 in. | 5.4 lb. | 2.5 lb. | 2.9 lb. |
|  | .656 in. | 7.5 lb. | 5.0 lb. | 2.5 lb. |
| After 647 hours | .719 in. | 4.9 lb. | 1.9 lb. | 3.0 lb. |
|  | .656 in. | 7.4 lb. | 4.3 lb. | 3.1 lb. |

TEST B

In comparison a test of a seal constructed as shown in FIG. 7 was run as described in Test A and produced substantially different results. The figures for the beginning of the test show typical values rather than tested values for that seal. The seal assembly was tested at both 500 and 1,000 hours of operation on a seal initially constructed as shown in FIGS. 2 and 3. However the radial width of the ferrule nose was too large and the nose was removed at 150 hours of testing. Thereafter the seal assembly was operated for an additional 350 hours to obtain the 500 hour valuation and was then again run for an additional 500 hours to obtain the 1,000 hour valuation.

|  | Seal Length | Down-Load | Up-Load | Difference |
|---|---|---|---|---|
| At beginning of test | .665 in. | 4.5 lb. | 3.5 lb. | 1.0 lb. |
|  | .585 in. | 5.8 lb. | 4.9 lb. | .9 lb. |
| After 500 | .665 in. | 3.9 lb. | 3.0 lb. | .9 lb. |

-Continued

|  | Seal Length | Down-Load | Up-Load | Difference |
|---|---|---|---|---|
| hours | .585 in. | 5.9 lb. | 5.1 lb. | .8 lb. |
| After 1,000 | .665 in. | 3.9 lb. | 3.1 lb. | .8 lb. |
| hours | .585 in. | 6.4 lb. | 5.6 lb. | .8 lb. |

The seal operated satisfactorily over all 1,000 hours of testing and when removed at 1,000 hours, the seal was in almost new condition showing considerably less wear than prior art seals.

TEST C

An assembly was constructed as shown in FIG. 7 and identical C-shaped cross section secondary seals were constructed out of both Viton rubber and Teflon (Registered trademark of E. I. Dupont De Nemours Corporation for a brand of tetrafluoroethylene). The seal assembly was first tested without the secondary seal and the results are herein shown in the Table C1. The difference between the download and the upload illustrated represents the hysteresis inherent in the assembly which hysteresis is most likely caused by friction of the wave spring in movement against the back wall of the housing and against the radial wall of the ferrule. Thereafter the resilient secondary seal was placed in position within the seal assembly after having been lubricated with oil to assure accuracy of reading. The seal was then cycled between maximum and minimum travel lengths to assure that the assembly was properly made. The resultant assembly was then tested by a vacuum testing device to determine that an adequate seal had been effected. The assembly passed the vacuum test. It was then tested for hysteresis with the results shown in Table C3. The seal assembly was then disassembled and the resilient secondary seal was removed and the Teflon seal was assembled in place after oiling. The new assembly was then cycled from maximum to minimum lengths to assure proper assembly. The seal was then tested on the vacuum test equipment. The seal assembly failed the vacuum test. The assembly was then tested for hysteresis with the results shown in Table C5.

In order to show repeatability of results an identical series of tests were run in the same manner 11 days after tests C1, C3, and C5. The tests were run in the same manner and the results are shown on Table C2, C4, and C6.

|  | Seal Length | Down-Load | Up-Load | Difference |
|---|---|---|---|---|
| C-1 | .585 in. | 4.4 lb. | 4.2 lb. | 0.2 lb. |
|  | .665 in. | 2.95 lb. | 2.6 lb. | 0.35 lb. |
| C-2 | .585 in. | 4.1 lb. | 3.75 lb. | 0.35 lb. |
|  | .665 in. | 2.9 lb. | 2.4 lb. | 0.5 lb. |
| C-3 | .585 in. | 4.8 lb. | 4.15 lb. | 0.65 lb. |
|  | .665 in. | 3.35 lb. | 2.25 lb. | 1.1 lb. |
| C-4 | .585 in. | 4.2 lb. | 3.9 lb. | 0.3 lb. |
|  | .665 in. | 2.85 lb. | 2.2 lb. | 0.65 lb. |
| C-5 | .585 in. | 7.6 lb. | 2.5 lb. | 5.1 lb. |
|  | .665 in. | 2.0 lb. | 1.0 lb. | 1.0 lb. |
| C-6 | .585 in. | 7.6 lb. | 4.5 lb. | 3.1 lb. |
|  | .665 in. | 3.1 lb. | .8 lb. | 2.3 lb. |

It can be seen that the use of a resilient C-shaped cross section secondary seal according to my invention substantially reduces the hysteresis drag encountered in prior art O-ring seals or in non-resilient C-ring seals. This reduction in hysteresis allows the use of a smaller spring force while maintaining adequate seal at the primary sealing face and at the secondary sealing face. The use of the C-shaped cross section secondary seal ring provides a secondary seal ring which is capable of swelling internally into the groove and of internal deflection of the legs of the C while sealing effectively without increase in hysteresis over the life of the seal.

It can therefore be seen from the above that my invention provides a novel seal ring formed in a C-shaped cross section and a novel shaft seal assembly equipped with such a ring. Further, I have described a method of making the ring which provides for flash at a point removed from the inner and outer diameter radial line, thereby allowing flash to be trimmed without adversely affecting the seal ring.

The use of my seal ring reduces the hysteresis encountered in the use of O-rings as secondary seals in prior art seal assemblies.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A seal assembly comprising: a seal housing, the housing being U-shaped in cross section having inner and outer diameter axially directed legs interconnected at one axial end by a bight wall, a seal ring assembly including a seal associated first ring received in said housing, said first ring having an axial end interior of said housing opposite said bight wall and a second axial end projecting from said housing, a ferrule interior of said housing having at least a portion thereof disposed between the said axial end of said first ring and the bight wall, a spring disposed in said housing between said ferrule and said bight wall, said spring effective to urge said ferrule against said first ring whereby said first ring is urged away from said bight wall, a second seal ring disposed in said housing, a chamber in said housing defined by the inner diameter leg of said housing, a radial wall of said first ring, and an axial wall of said first ring, said second seal ring dimensioned to be freely received within said chamber, said second seal ring being C-shaped in cross section and being formed of a resilient material with legs of the C-shape contacting the inner diameter leg of the housing and the axial wall of the first ring, the legs being resiliently displaceable axially inwardly towards one towards one another by the sealing contact with the said axial wall and inner diameter leg, the secondary seal ring being free from axial compressive forces generated by said spring, the chamber closed opposite said radial wall by at least a portion of said ferrule, the ferrule positioned and dimensioned with respect to the secondary seal to restrict rotation of the secondary seal ring, said secondary seal ring having an annular groove extending thereinto from a surface thereof forming the C-shaped cross section, the groove having walls, and the walls being free of contact with other elements of the seal assembly whereby the walls of the groove are free to swell inwardly towards one another to accommodate swelling of the secondary seal.

2. The assembly of claim 1 wherein the secondary seal has a radial cross section substantially circular with a truncated axial end face formed as a chordal face, the groove entering from the chordal face, the ferrule positioned opposite the chordal face having a planar wall portion opposed to the chordal face whereby rotation of the secondary seal will cause portions of the chordal face to contact the planar face of the ferrule to prevent further rotation of the secondary seal.

3. A seal assembly comprising: a seal housing, the housing having inner and outer diameter radially spaced apart legs interconnected at one axial end by a bight wall, a seal ring assembly disposed internally of the housing projecting from an open end thereof terminating in a seal face, a ferrule positioned intermediate an axial end face of the seal ring assembly and the bight wall of the housing, a spring effective to urge the ferrule and seal ring assembly toward the open axial end, a secondary seal ring positioned in the housing having inner and outer diameter circumferential portions in sealing contact respectively with circumferential portions of a leg of the housing and a wall of the seal ring assembly, the secondary seal ring being resilient to maintain sealing contact with said housing leg and seal ring wall and substantially C-shaped in cross section with legs resiliently displaced inwardly by the sealing contact, the C-shape having an axial end face formed as a chordal face with a groove extending axially into the body of the secondary seal ring therefrom to a depth beyond a radial diameter of the ring, the ferrule positioned and dimensioned with respect to the secondary seal ring to restrict rotation of the secondary seal ring, the ferrule having a portion abutting the seal ring assembly restricting movement of the ferrule relative to the secondary seal ring and preventing loading contact of the ferrule against the secondary seal ring.

4. A seal assembly comprising: a seal housing, said housing having an axial open end with inner and outer diameter radially spaced apart legs interconnected at an opposite axial end by a bight wall, a seal ring disposed internally of the housing projecting from said axial openend of the housing, a ferrule in said housing positioned intermediate an axial end face of the seal ring and the bight wall of the housing, a spring effective to urge the ferrule and seal ring toward said open axial end of the housing a secondary seal ring positioned in the housing having inner and outer diameter circumferential portions in sealing contact respectively with circumferential portions of a leg of the housing and a wall of the seal ring, said secondary seal ring being resilient to maintain sealing contact with said housing leg and seal ring wall and substantially C-shaped in cross section with legs resiliently displacable inwardly by said sealing contact, the C-shaped secondary seal ring having an axial end face formed as a chordal face with a groove extending axially from said chordal face into the body of said secondary seal ring to a depth beyond a radial diameter of the ring, the groove having an internal clearance whereby swelling of the ring can be accommodated by inward displacement of the material of the ring into the groove, and the inner and outer diameter surfaces of said C-shaped secondary seal ring being curved.

* * * * *